Nov. 22, 1949  J. U. LEHN ET AL  2,489,093
ANIMAL TRAP
Filed July 3, 1945  2 Sheets-Sheet 1
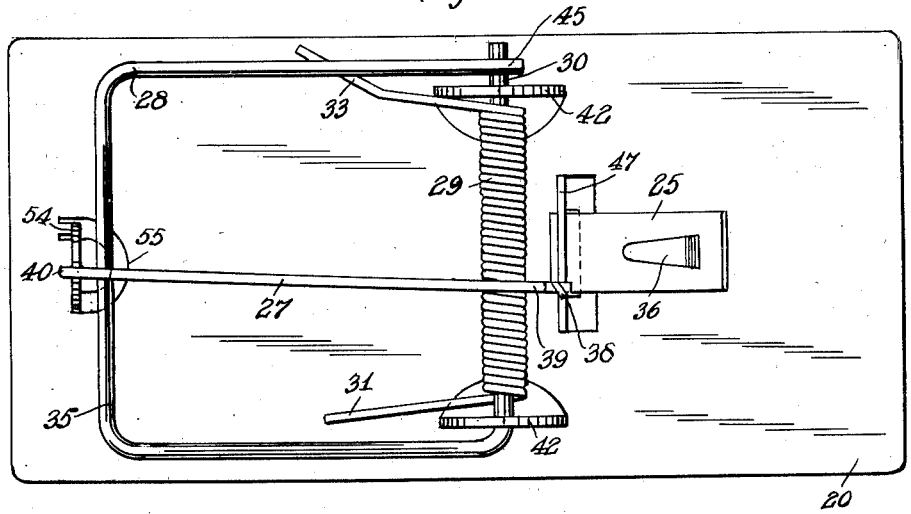
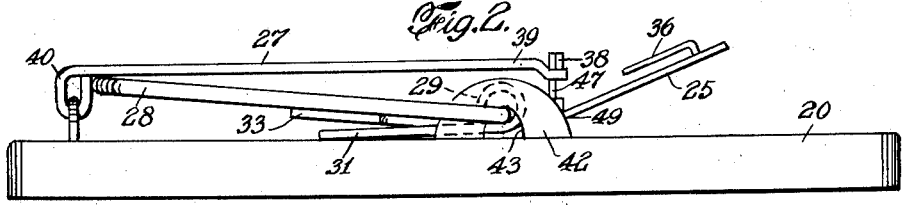
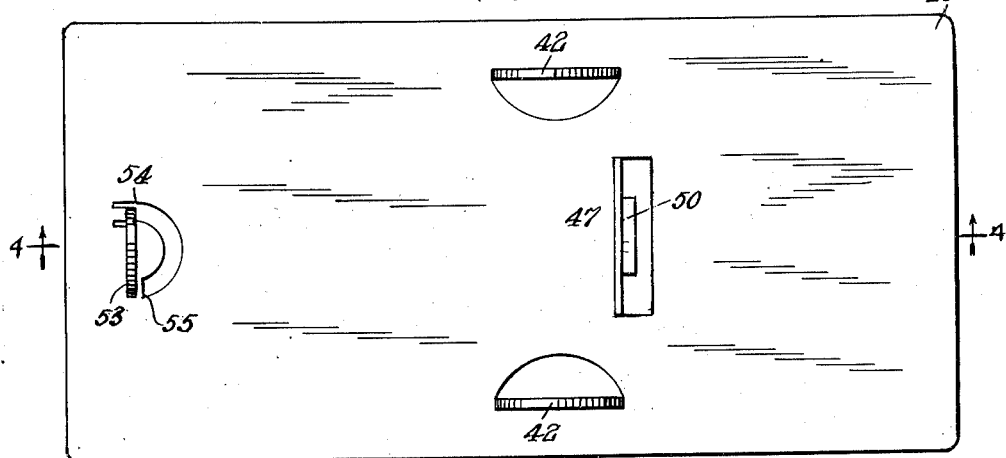
INVENTORS
JOHN U. LEHN AND
HERSHEY ROY GRAYBILL
BY
Robert E. Burns
ATTORNEY.

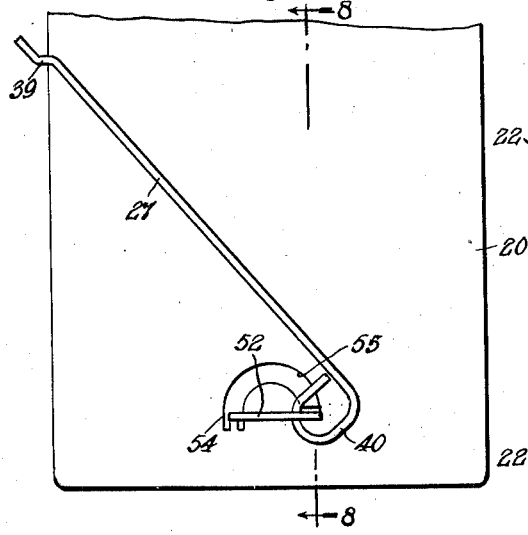

Patented Nov. 22, 1949

2,489,093

UNITED STATES PATENT OFFICE 2,489,093

ANIMAL TRAP

John U. Lehn, Lititz, and Hershey Roy Graybill, Manheim, Pa., assignors to Animal Trap Company of America, Lititz, Pa., a corporation of Pennsylvania Application July 3, 1945, Serial No. 603,054

10 Claims. (Cl. 43—81)

1

The present invention relates to traps for catching small animals such as rats and mice.

Traps of this type are made on automatic machinery as this is the only way a low cost trap can be made for sale in a field where there is such keen competition. While automatic machinery reduces the manufacturing costs by reason of the high rate of production made possible, its initial cost is high and any modification in its operation or in the materials handled is difficult and expensive. The manufacturing limitations thus imposed make any alteration in the trap produced a major manufacturing problem. Thus any improvement contemplated in the trap produced must not only improve the product, but also must be within the scope of economic manufacture by the specialized machinery available.

Traps for rats, mice and other small animals have heretofore been customarily provided with a wood base on which the operating elements of the trap are mounted. The present scarcity of suitable lumber and its high cost make it desirable to use sheet metal instead of wood bases wherever it is possible to do so. Moreover, the use of metal base traps is preferable in the tropics and other localities where the extreme dampness may cause warping of the wood and where wood bases may be quickly destroyed by fungus and termites or other insects. At the same time, it is desirable to retain known types of bow, locking bar and bait pedal constructions and to follow, insofar as possible, the same manufacturing procedure as is employed for wood base traps.

Because of the dissimilarity in the properties of sheet metal and wood, the use of sheet metal for the bases of traps of the kind to which the present invention pertains, presents serious problems, both as regards the trap structure and the economical manufacture of the traps. Staples obviously cannot be driven into a metal base like they are in wood, to secure the operating parts of the trap to the base. As the sheet metal is very much thinner than the usual wood base, it does not have the same rigidity and gives no lateral support to members extending through it to hold the members rigid relative to the base and prevent their locking or tipping. Moreover, any lugs or ears punched from the base for the purpose of attaching the operating parts leaves holes in the base so that no supporting surface is provided at points where it is most needed. The problems of securing the operating parts of the trap to a sheet metal base is thus quite different from that of securing them to a wood base, and is in many respects more difficult.

2

Metal working machinery is ordinarily quite different from machinery for working with wood. However, in order to make full use of automatic machinery at present available for manufacturing such traps and to provide for quickly shifting from the production of wood base traps to the production of metal base traps, and vice versa, depending on the relative availability and cost of the material, and the use for which the traps are intended, it is desirable to be able to use the same automatic machines for manufacturing both wood base traps and metal base traps. Because of the different properties and characteristics of the materials and the resulting differences in the structure of the trap, the use of the same machine to manufacture traps having metal bases and traps having wood bases, presents still further problems both in the method of operation and in the design of the trap to make possible the dual use of the machines.

It is an object of the present invention to provide an improved sheet metal base trap of the type outlined above that can be made with minimum alteration of existing trap making machinery used for wood base traps. Another object of the invention is to provide a method of assembling component parts of the trap in conformity with this improved construction. A further object of the invention is to provide a sheet metal base trap with a minimum number of parts and improved operating characteristics. A still further object is to provide greater sensitivity and to provide an improved method for mounting the locking bar on the base after the bar has been completely formed.

Further objects and advantages of the invention will be understood from the following description and claims, and from the accompanying drawings which show by way of example, a preferred form of the invention.

In the drawings,

Fig. 1 is a plan view of a trap in accordance with the present invention, showing the trap in a set position.

Fig. 2 is a side elevation of the trap also showing it in set position.

Fig. 3 is a plan view of the base before the bait pedal, locking bar, bow and spring have been mounted thereon.

Fig. 4 is a section through Fig. 3 as indicated by the lines 4—4 thereon.

Fig. 5 is an end elevation of the base of Fig. 3 at the end where the locking bar is secured.

Fig. 6 is a section through Fig. 4, as indicated by the line 6—6 thereon.

Fig. 7 is a detail in plan, to illustrate the method by which the locking bar is secured to the base.

Fig. 8 is a section through Fig. 7, as indicated by the line 8—8 thereon.

Fig. 9 is a section similar to Fig. 8, but showing the locking bar after it has been attached, and Fig. 10 is a section through Fig. 9 as indicated by the lines 10—10 thereon.

Referring now to the drawings, the preferred form of trap there shown has a sheet metal base 20. The material from which the base is made is preferably sheet steel of a composition to insure that it may be easily drawn in the manner hereinafter specified and of sufficient thickness to impart the desired rigidity to the trap. The base is formed with a raised platform 21, and a continuous integral downwardly projecting rim 22. This rim not only spaces the platform from a supporting surface, but stiffens and strengthens the base. Thus, the sheet metal used may be of light enough gauge to enable proper formation of integral loops of metal for attaching the operative parts of the trap, as hereafter described, and yet, by reason of the rim 22, provide an adequately stiff and strong platform or base of approximately the same overall height as a wood base.

The operating parts of the trap are mounted on the base, as hereinafter described, and include a bait pedal 25, a locking bar 27 and a bow 28. The bow is snapped from set to sprung position by a coil spring 29 surrounding its pivot bar portion 30 and bearing at 31 on the platform and engaging the bow at 33. The animal to be caught is gripped between the striking bar 35 of the bow and the right hand edge portion (Fig. 1) of the platform.

The trap is sprung by movement of the bait pedal 25 as the animal attempts to remove bait that is held by a bait hook 36 thereof. The movement of the bait pedal shifts a trigger portion 38 thereof to release the end 39 of the locking bar so that it may pivot about its loop 40 and permit the spring 29 to snap the bow clockwise (Fig. 1) from set to sprung position.

The sheet metal base to which the parts just described are pivotally secured is best shown in plan in Fig. 3, and in longitudinal section in Fig. 4. In each case the mounting is effected by striking from the metal of the platform upstanding ears positioned to lie substantially normal to the plane of the platform. The ears are formed with openings to provide loops for pivotally receiving the parts to be carried thereby.

The bow 28 is pivotally mounted on the base adjacent the midportion so that it may lie flat on the base on either side of the pivot line. To this end two loops 42 are struck from the metal of the platform and then bent upwardly, as shown in Fig. 4, to lie above the surface thereof. Each loop is of inverted U-shape providing between the loop and the base an opening 43, that is relatively narrow at its apex but broadens out toward the base. The width of each leg of the loop also preferably increases toward the base, as clearly seen in Figs. 2 and 4. The narrow apex of the opening 43 provides a pivot bearing for accurately positioning the pivot bar 30 of the bow, while the wider lower portion of the opening faciltates assembly of the trap, as will appear below. The flaring leg portions of the loop assures a stronger, more rigid loop structure.

To assemble the bow on the base, the free end of the pivot bar, at the top of Fig. 1, is passed through one of the loops 42, after which the spring 29 is positioned on the bar. The free end is then passed through the other loop 42 and engaged in a loop 45 formed at the end of the adjacent bow side arm. The arm 33 of the spring 29 is then positioned under the bow, as shown in Fig. 1, and assembly of the bow and spring on the platform is complete. Normally the bow is urged by the spring to swing clockwise (Fig. 2) and bear against the right hand edge position of the platform (Fig. 2). This is the sprung position of the trap. To hold the bow in the set position shown in Figs. 1 and 2, the locking bar and bait pedal are employed.

The bait pedal is pivotally mounted on the platform on an axis parallel to the axis of the bow. To mount the bait pedal on the base, a loop or ear 47 is stamped out from the metal of the base and bent up at right angles to the base. The ear 47 is substantially of inverted U-shape having a horizontal top portion 48 that is spaced from and parallel to the base and provides a straight bar or fulcrum for the bait pedal, and spaced vertical portions 48a supporting the pivot bar 48 and connecting it with the base. The bait pedal is of approximately L-shape with a depending loop portion 49 that passes under the pivot bar 48 and thereby provides a pivotal bearing for the bait pedal. As the stock forming the pivot bar 48 is bent up into a vertical position (Fig. 4) it bears edgewise on the bait pedal and thus provides in effect a knife edge fulcrum for the pedal. The sensitivity of the trap is thereby increased since a relatively small force, as by an animal barely touching the bait pedal, will be sufficient to move the pedal and release the trap.

As will be seen in Fig. 3, the stock for forming the bait pedal pivot 47 is stamped out of the base, leaving a substantially U-shaped opening in the base. However, the portion of metal 50 immediately under the cross bar 48, when the latter is bent up to final position, is left intact and in place, providing a support for the loop portion 49 of the bait pedal when the trap is in sprung position and the bait pedal is hence released from the upward force of the locking bar. The loop portion of the bait pedal is thereby prevented from dropping down into the opening formed by stamping out the bait pedal pivot 47.

The bait pedal may rock freely about its pivot, its shape and weight being such that normally it will fall clockwise (Fig. 2) against the platform. When the trap is set, however, the pedal lies in the position shown in Fig. 2, by reason of engagement with it of the end 39 of the locking bar 27. The locking bar is in turn held in position by the tendency of the bow striking bar to swing clockwise under the influence of the spring 29.

The locking bar 27 is pivotally mounted on the platform at the end opposite the bait pedal by means of an upstanding loop or ear 52 that also is formed from the material of the platform. This ear is cut out in the shape of a C with one end at 53 severed from the sheet. The other end, at 54, remains connected therewith. At the same time the loop or ear 52 is formed, an opening 55 is formed in the platform in such position that it is directly beneath the free end 53 of the loop when bent up to vertical position, as shown in Fig. 8.

The method by which the locking bar 27 is attached to the base as outlined above and described more fully below, forms a part of our invention. Traps have been made in which a locking bar provided with an open loop or eye was placed in an opening formed in the base, after which the locking eye was closed. Such methods of assembly are costly to achieve with automatic machinery and do not insure that the bar will pivot freely to allow the trap to be sprung easily. By our improved method, the locking bar is completed with a closed eye before assembly on the base, so that the complete locking bar can be formed in one operation.

The steps by which the locking bar is attached to the base are illustrated in Figs. 7, 8, 9 and 10. The C-shaped loop 52 is stamped out of the stock of base and bent up at right angles, as shown in Fig. 8, with the free end 53 of the loop positioned above and spaced from the top of the base and aligned with the hole 55. The completely formed locking bar is placed on the base in the position shown in Fig. 7, with the closed eye of the bar surrounding the hole 55 under the free end of the loop portion 52, and is held in this position in any suitable manner. Next by means of suitable die shapes, as will be apparent to one skilled in the art, the loop 52 is pushed downwardly from its position in Fig. 8, until the end 53 passes through the opening 55 of the platform and lies beneath it, and the end 53 is clinched over at 57 as shown in Fig. 9, thereby closing the loop and permanently attaching the locking bar to the base.

Since the material forming the loop 52 is bent up into a vertical plane, the eye portion of the locking bar when in set position, engages the edge of the material. The loop 52 thus provides in effect a knife edge fulcrum for the locking bar and contributes to the sensitivity of the trap. Moreover, it will be noted that, as in the case of the loop 47 for the bait pedal, the loop 52 is formed of a C-shaped portion punched out of the stock, leaving the stock directly under the loop 52 undisturbed. There is thus provided a portion of material 58 (Fig. 4) in the plane of the platform or base that supports the eye portion of the locking bar when in released position and prevents it from dropping down into the hole from which the material for the loop 52 is stamped.

From the foregoing description it will be seen that we have provided an improved metal base animal trap that is simple to manufacture, uses certain known and tested components, and affords important advantages over types heretofore known. Particularly we have provided a trap with a base that is simple to make, insures proper alignment of the parts, and has supporting loops that are integral with the material of the platform. The method by which a looped member can be attached to the base permits completion of that member prior to assembly as well as a simplified attaching operation.

What we claim and desire to secure by Letters Patent is:

1. In an animal trap comprising a sheet metal base having a flat platform with its edges bent over at the sides and ends to form a downwardly projecting rim, a bait pedal pivotally mounted on said platform, a bow pivotally mounted on said platform, the improvement including means for attaching a locking bar to the platform comprising a C-shaped portion of material constituting a cutout of the material of the platform and having a bend at right angles to the platform to provide a loop integral with said platform at one end and extending through and fastened to said platform at the other end, a locking bar attached to the platform by said loop, and resilient means to urge said bow in one direction against the restraining action of said locking bar and bait pedal.

2. In an animal trap comprising a sheet metal base having a flat platform with its edges bent over at the sides and ends to form a continuous downwardly projecting rim, the improvement including an upstanding loop constituting a cutout portion of the material of said platform having a bend at right angles thereto to provide a pivot bar, a bait pedal pivotally mounted on said pivot bar, a portion of material integral with said platform extending beneath said pivot bar and being substantially in the plane of said platform to provide a smooth bearing surface for said pedal, a bow including a pivot bar pivotally mounted on said platform, means for attaching a locking bar comprising a C-shaped portion of said platform constituting a cutout and having a bend extending upwardly at right angles to the said platform to provide a loop integral with said platform at one end and extending through and mechanically fastened thereto at the other end, a locking bar attached thereto, and resilient means carried by said pivot bar to urge said bow in one direction against the restraining action of said locking bar and bait pedal.

3. In an animal trap comprising a sheet metal base having a flat platform with its edges bent over at the sides and ends to form a continuous downwardly projecting rim, the improvement including an upstanding loop constituting a cutout of the material of said platform, having a bend at right angles thereto to provide a pivot bar, a bait pedal pivotally mounted on said pivot bar, a portion of material integral with said platform and extending beneath said pivot bar and being substantially in the plane of said platform to provide a smooth bearing surface for said pedal, a bow including a pivot bar pivotally mounted on said platform, a locking bar pivotally mounted on said platform, and resilient means carried by said pivot bar and separable therefrom to urge said bow in one direction against the restraining action of said locking bar and bait pedal.

4. In an animal trap comprising a sheet metal base having a flat platform with its edges bent over at the sides and ends to form a downwardly projecting rim, a bait pedal pivotally mounted on said platform, the improvement including a pair of parallel U-shaped loops constituting cutout portions of the material of said platform and positioned normal thereto, a bow including a pivot bar pivotally mounted in said loops, means for attaching a locking bar to said platform comprising a C-shaped portion cut from the material of said platform, constituting a cutout, and having a bend extending upwardly at right angles to said platform to provide a loop integral with said platform at one end and extending through and fastened thereto at the other end, a locking bar attached to the platform, and resilient means carried by said pivot bar and separable therefrom to urge said bow in one direction against the restraining action of said locking bar and bait pedal.

5. In an animal trap comprising a sheet metal base having a flat platform with its edges bent over at the sides and ends to form a downwardly projecting rim, the improvement including an upstanding loop constituting a cutout portion of the material of said platform to provide a pivot bar, a bait pedal pivotally mounted on said pivot bar and a portion of material integral with said platform and extending beneath said pivot bar and being substantially in the plane of said platform to provide a smooth bearing surface for said pedal, a pair of parallel upstanding loops constituting cutout portions of the material of said platform and positioned normal thereto, a bow including a pivot bar pivotally mounted in said last mentioned loops, means for attaching a locking bar to the base comprising a portion of material cut from the material of said platform constituting a cutout and having a bend to provide a loop having one end integral with said platform and the other end extending through the platform and clinched to said platform, a locking bar attached thereto, and resilient means carried by said pivot bar and separable therefrom to urge said bow in one direction against the restraining action of said locking bar and bait pedal.

6. The method of pivotally mounting a member having an eye on a flat sheet, comprising the steps of cutting a C-shaped portion in said sheet while leaving it secured thereto at one end, bending said portion to lie substantially normal to said sheet with the free end of said portion spaced therefrom, positioning the eye of said member flat against said sheet and beneath said free end, and thereafter forcing said free end through said sheet and securing the same on the side opposite said eye, to said sheet.

7. In an animal trap comprising a sheet metal base having a flat platform and an integral downwardly projecting rim and a spring actuated bow including a pivot bar, a locking bar and a bait pedal all operatively mounted on said base, the improvement that comprises providing said base with an upstanding hollow loop comprising a cutout portion of the material of said platform to provide a pivot bar, parallel to the pivot bar of the bow, for pivotally supporting said bait pedal, a portion of material integral with said platform and extending beneath said pivot bar and said bait pedal in substantially the plane of said platform, means for attaching a locking bar to the base comprising a portion of material constituting a cutout of the material of said platform and having a bend extending upwardly to provide a hollow loop parallel to said pivot bar and integral with said platform, a portion of material integral with said platform and extending under said loop substantially in the plane of said platform, and a pair of parallel upstanding hollow U-shaped loops constituting cutouts of the material of said platform and positioned normal thereto to receive the pivot bar of said bow.

8. In an animal trap comprising a sheet metal base having a flat platform and an integral downwardly projecting rim and a spring actuated bow including a pivot bar, a locking bar and a bait pedal all operatively mounted on said base, the improvement that comprises providing said base with an upstanding hollow loop comprising a cutout portion of the material of said platform to provide a pivot bar, parallel to the pivot bar of the bow, for pivotally supporting said bait pedal, and a portion of material integral with said platform and extending beneath said pivot bar and said bait pedal in substantially the plane of said platform.

9. In an animal trap comprising a sheet metal base having a flat platform and an integral downwardly projecting rim and a spring actuated bow including a pivot bar, a locking bar and a bait pedal all operatively mounted on said base, the improvement that comprises providing said base with an upstanding loop formed of a U-shaped cutout portion of the material of said platform having a bend extending upwardly at approximately right angles thereto to provide a pivot bar substantially parallel to the pivot bar of said bow, for pivotally supporting said bait pedal and a tongue of material integral with said platform and extending beneath said pivot bar in substantially the plane of said platform.

10. In an animal trap comprising a sheet metal base having a flat platform and an integral downwardly projecting rim and a spring actuated bow including a pivot bar, a locking bar and a bait pedal all operatively mounted on said base, the improvement that comprises providing said base with means for attaching the locking bar to the base comprising a C-shaped portion of said platform, constituting a cutout, and having a bend extending upwardly at right angles to provide a loop integral with said platform at one end and extending through and mechanically fastened thereto at the other end.

JOHN U. LEHN.
HERSHEY ROY GRAYBILL.

REFERENCES CITED

The following references are of record in the file of this patent:

UNITED STATES PATENTS

| Number | Name | Date |
|---|---|---|
| 528,671 | Hooker | Nov. 6, 1894 |
| 643,548 | Smith | Feb. 13, 1900 |
| 647,258 | Hall | Apr. 10, 1900 |
| 659,783 | Bell | Oct. 16, 1900 |
| 661,068 | Nelson | Nov. 6, 1900 |
| 1,342,255 | Doust | June 1, 1920 |
| 1,462,102 | Dodson | July 17, 1923 |
| 1,615,963 | Stanley | Feb. 1, 1927 |
| 1,616,786 | Dorn | Feb. 8, 1927 |
| 2,052,106 | Myklebust | Aug. 25, 1936 |
| 2,068,865 | Neuhausen | Jan. 26, 1937 |
| 2,144,956 | Arndt | Jan. 24, 1939 |

FOREIGN PATENTS

| Number | Country | Date |
|---|---|---|
| 9,501 | Great Britain | A. D. 1914 |
| 288,894 | Great Britain | Apr. 19, 1928 |